United States Patent [19]

Tamura et al.

[11] 4,342,353
[45] Aug. 3, 1982

[54] RADIAL TIRE FOR HEAVY LOAD VEHICLES

[75] Inventors: Akira Tamura, Kodaira; Yasuo Suzuki, Akigawa, both of Japan

[73] Assignee: Bridgestone Tire Co., Ltd., Tokyo, Japan

[21] Appl. No.: 268,520

[22] Filed: May 29, 1981

[30] Foreign Application Priority Data

Jun. 9, 1980 [JP] Japan ................................. 55/77492

[51] Int. Cl.³ ........................ B60C 15/00; B60C 15/06
[52] U.S. Cl. ........................... 152/362 R; 152/362 CS
[58] Field of Search ......... 152/362 R, 362 CS, 330 R, 152/DIG. 9

[56] References Cited

U.S. PATENT DOCUMENTS

| | | | |
|---|---|---|---|
| 4,046,183 | 9/1977 | Takahashi et al. | 152/362 R |
| 4,215,737 | 8/1980 | Motomura et al. | 152/362 R |
| 4,265,292 | 5/1981 | Inoue | 152/362 R |
| 4,269,251 | 5/1981 | Harrington et al. | 152/362 R |
| 4,289,184 | 9/1981 | Motomura et al. | 152/362 R |

Primary Examiner—Edward C. Kimlin
Assistant Examiner—Lois E. Boland
Attorney, Agent, or Firm—Sughrue, Mion, Zinn, Macpeak & Seas

[57] ABSTRACT

A giant radial tire for off-road vehicles which is obliged to be used under heavy load and which is provided with a highly durable bead portion construction in which that end of the wire cords of the turn-up portion or reinforcing layer which is located below the maximum width position of the tire and disposed outside the bead core is arranged at the position which is higher than the height h of the rim flange of a bead portion mounting rim but lower than the height which is three times higher than the above height h, and the outer coating rubber of the bead portion has a thickness distribution satisfying the following condition given by $$0.30 \leq (B \cdot C / A^2) \times (RW/SW) \leq 0.55$$

where
RW is a width between bead legs of the tire mounted on the rim,
SW is a maximum width between side portions of the tire mounted on the rim,
A is a bead portion reference width,
B is a minimum thickness of the rubber at the bead portion, and
C is a maximum thickness of the rubber at the bead portion.

5 Claims, 6 Drawing Figures

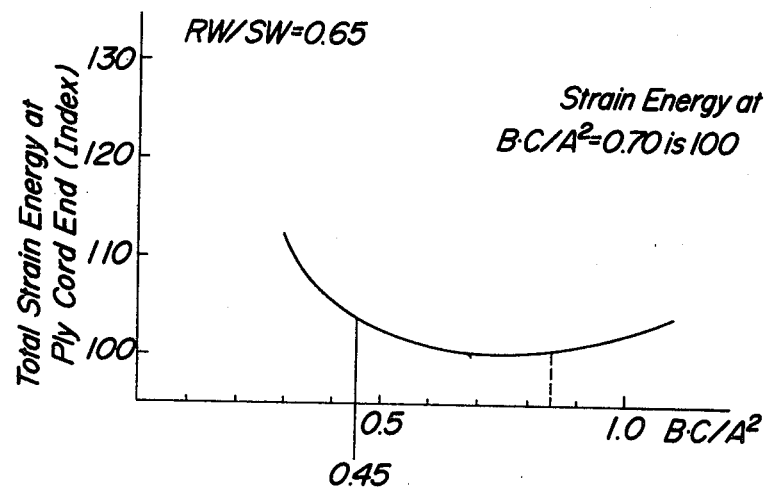
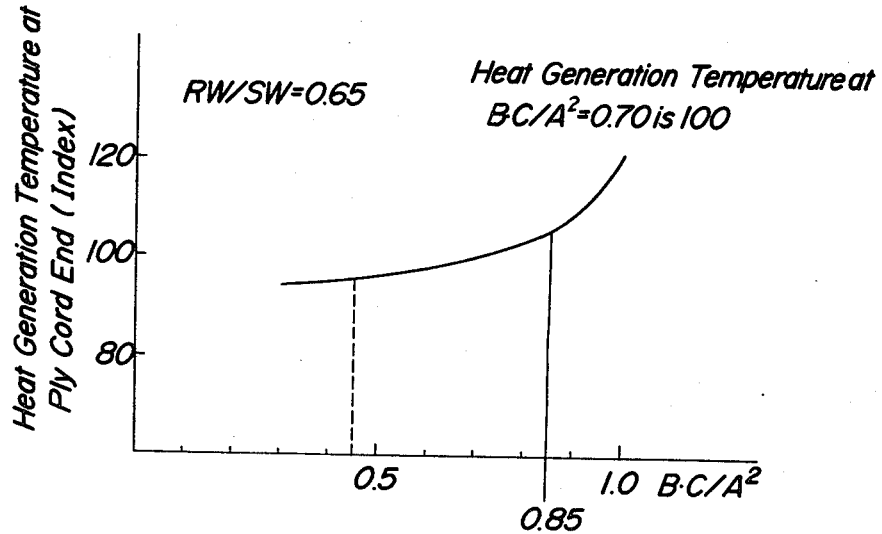

RADIAL TIRE FOR HEAVY LOAD VEHICLES

BACKGROUND OF THE INVENTION

1. Field of the Invention

This invention relates to radial tires for heavy load vehicles and more particularly to a giant radial tire for off-road vehicles which is obliged to be used under a heavy load and which is provided with a highly durable bead portion.

2. Description of the Prior Art

The bead portion of the above mentioned kind of tire has heretofore frequently induced a separation failure due to its poor durability. That is, the durability of the bead portion is dependent on the strain and heat produced due to deformation caused by the load subjected to the tire. This load deformation becomes larger as the load subjected to the radial tire becomes heavy in response to its use and becomes the maximum when the radial tire is used for off-road vehicles. In addition, the giant radial tire representing the radial tires for the above mentioned kind of use has the disadvantage that radiation of heat is poor owing to the remarkably large volume of the tire if compared with that of the tires used for the other purposes.

Influence of such strain and heat causes troubles with respect to the above mentioned durability of the bead portion where the above mentioned strain and heat are maximum.

Investigations on the cause of the separation failure induced in the bead portion of the above mentioned kind of tire have demonstrated the result that the crack produced at the end portion of the tire skeleton such as the ply cord end or chafer cord end reaches the surface of the tire so as to induce the separation failure of the bead portion, thereby finally making the tire unable to use.

Many attempts have heretofore been proposed to eliminate the above mentioned separation failure, for example, the end portion of the wire cord such as metal cord particularly steel cord is changed in position or the cord end is covered with organic textile cord fabric or rubber sheet having special property, or organic textile cord layer or considerably extensible wire cord layer is disposed near the cord end. These measures have been applied separately or in combination thereof, but none has led to satisfactory result.

SUMMARY OF THE INVENTION

An object of the invention, therefore, is to provide a radial tire for heavy load vehicles which is provided with a highly durable bead portion which can eliminate the above mentioned drawbacks which have been encountered with the prior art techniques.

A feature of the invention is a provision in a radial tire for heavy load vehicles comprising a carcass composed of wire cord plies having cords arranged substantially in a radial plane of the tire and wound around a bead core and a rubber stock disposed thereon from the inside to the outside thereof to form a turn-up portion, and a bead portion including at least one reinforcing layer arranged along the turn-up portion of the carcass and having cords crossed with the cords of said turn-up portion of the carcass, the reinforcing layer together with the turn-up portion of the carcass being sandwiched between and embedded in the rubber stock and an outer coating rubber, of the improvement in which that end of the wire cords of the turn-up portion or reinforcing layer which is located below the maximum width position of the tire and disposed outside the bead core is arranged at a position which is higher than the height h of the rim flange of a bead portion mounting rim but lower than the height which is three times of the above height h, and the outer coating rubber of the bead portion has a thickness distribution with respect to a bead portion reference width A which is shorter than the height h of the rim flange and measured from the outer surface of the bead portion through the center of the bead core in parallel with the rotary axis of the tire to the carcass ply, the thickness distribution satisfying the following condition given by $$0.30 \leq (B \cdot C/A^2) \times (RW/SW) \leq 0.55$$

where
- RW is a width between bead legs of the tire mounted on the rim,
- SW is a maximum width between side portions of the tire mounted on the rim,
- A is a bead portion reference width,
- B is a minimum thickness of the rubber at the bead portion, and
- C is a maximum thickness of the rubber at the bead portion.

Further objects and features of the invention will be fully understood from the following detailed description with reference to the accompanying drawings, in which:

BRIEF DESCRIPTION OF THE DRAWINGS

FIG. 3 is a graph illustrating a relation between total strain energy at the ply cord end and $B \cdot C/A^2$;

FIG. 4 is a graph illustrating a relation between heat generation temperature at the ply cord end and $B \cdot C/A^2$;

DETAILED DESCRIPTION OF THE PREFERRED EMBODIMENTS

Inventors have considered the position of the wire cord ends and the thickness distribution of the outer coating rubber of the bead portion covering these wire cord ends with respect to the tire for heavy load vehicles having a so-called radial carcass construction, in which the wire cords of the metal, for example, steel are arranged in the radial surface of the tire or along the surface crossed therewith by an extremely small angle, and recognized the fact that the use of the above mentioned measures can eliminate the separation failure of the bead portion. The invention is attained based on the above mentioned recognition.

In the present invention, the above mentioned reinforcing layer may be composed of wire cords similar to or different from the ply cord of the carcass or may be composed of inorganic or organic textile yarns or cords or fabrics which can be used in general as the tire cords or may be composed of adequate combination thereof. Particularly, if the reinforcing layer is composed of the wire cords, the end thereof must be arranged in the similar manner as the end of the carcass ply cord.

Figure 1:
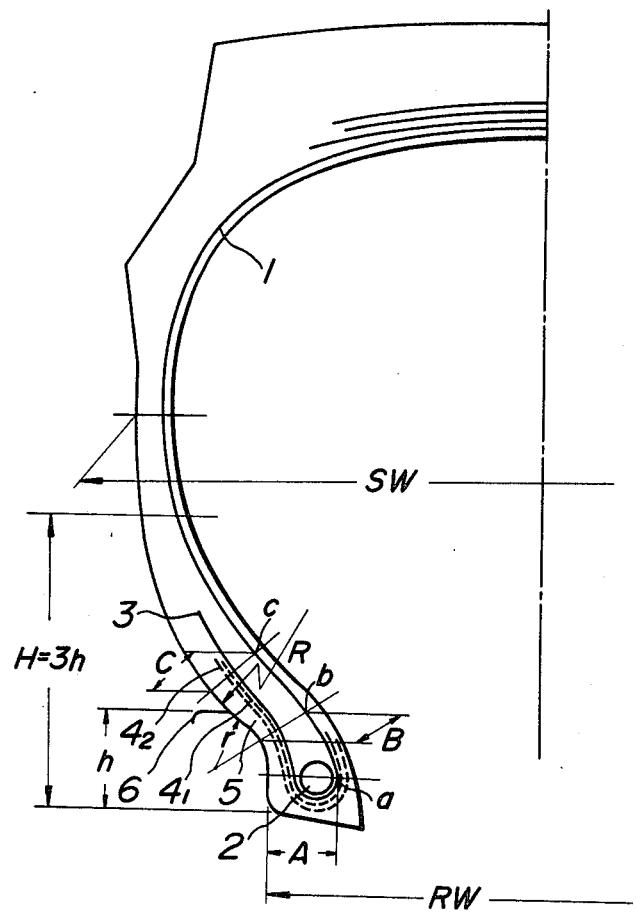
FIG. 1 is a cross-sectional view of left half of a tire embodying the present invention.

In FIG. 1, reference numeral 1 designates a carcass composed of wire cords arranged in a radial plane, 2 a bead core, 3 a turn-up portion of the carcass wound around the bead core 2 from the inside toward the outside thereof, and $4_1$, $4_2$ are reinforcing layers composed of two textile fabrics each including textile cords crossed with the wire cords of the carcass 1 and also crossed with each other.

Figure 2:
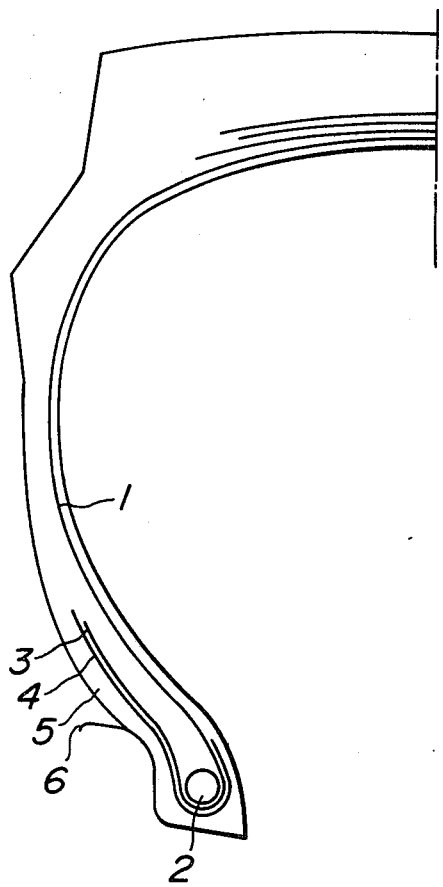
FIG. 2 is a similar view of another tire embodying the present invention showing a modified reinforcing layer thereof.

In FIG. 2, reference numeral 4 designates a reinforcing layer composed of wire cords, whose upper ends are located at a position above the upper end of the turn-up portion of the carcass.

In FIGS. 1 and 2, on the bead core 2 is disposed a rubber stock with or without interposing a flipper between the outer surface of the carcass and the inner surface of the turn-up portion 3. In FIGS. 1 and 2, reference numeral 5 designates an outer coating rubber determining the contour of the configuration of the tire with the turn-up portion 3 and the reinforcing layer 4 sandwiched between the rubber stock and the outer coating rubber. Reference numeral 6 designates a rim flange on which is mounted the bead portion and h is a height of the rim flange.

In the present invention, in the first place, the upper end of the turn-up portion 3 shown in FIG. 1 or the upper end of the reinforcing layer 4 shown in FIG. 2 must be located at a position between the level designated by the flange height h and the upper level designated by H which is three times larger than h.

Secondly, the rubber thickness distribution of the outer coating rubber 5 must be determined so as to satisfy the condition given by the above mentioned formula. The bead portion reference width A for determining the above mentioned formula is given by a distance between the outer surface of the outer coating rubber 5 and the carcass 1 and measured in a direction extending along the center of the bead core 2 in parallel with the rotary axis of the tire. RW is a width between the bead legs of the tire mounted on the rim, SW is a maximum width between the sidewalls of the tire under its inflated condition. Particularly, SW shows a maximum width between the sidewalls of the tire per se when it is not deformed by the load and exclusive of the projection provided directly below the shoulder portion of the tire for off-road vehicles for the purpose of preventing side cuts.

The outer coating rubber 5 has the minimum rubber thickness B at a point located at an outwardly facing concave curved region of the curved surface of the rising-up inner surface of the rim flange 6 and measured from the outer surface of the outer coating rubber 5 to the carcass 1. The outer coating rubber 5 has the maximum rubber thickness C at a point beyond an inflection point where the outwardly facing concave curved region is smoothly converted into an outwardly facing convex curved region. Both minimum rubber thickness B and the maximum rubber thickness C of the outer coating rubber 5 are smaller than the bead portion reference width A. It is a matter of course that these thicknesses B and C are measured in a normal line perpendicular to the carcass 1. Crossing points b and c where the above mentioned normal lines cross with the carcass 1, respectively, are located on the natural configuration line of the carcass 1 passing through a point a which is a crossing point between the line drawn from the outer surface of the outer coating rubber 5 through the center of the bead core in parallel with the rotary axis of the tire to the carcass 1 and the carcass 1.

FIG. 3 shows a test result obtained by making the value of A constant and by changing values of B and C. In FIG. 3, the ordinate shows the total strain energy at the ply cord end and the abscissa shows $B \cdot C/A^2$.

FIG. 4 shows a test result obtained by making the value of A constant and by changing values of B and C. In FIG. 4, the ordinate shows the heat generation temperature at the ply cord end, while the abscissa shows $B \cdot C/A^2$. In the tests shown by FIGS. 3 and 4, RW/SW is made 0.65.

As can be seen from the test results shown in FIGS. 3 and 4, if $B \cdot C/A^2$ is smaller than 0.45, the total strain energy becomes increased irrespective of the low heat generation temperature, thereby frequently inducing the separation failure at the bead portion. Meanwhile, if $B \cdot C/A^2$ is larger than 0.85, the heat generation temperature at the ply cord end becomes higher irrespective of small total strain energy at the ply cord end, thereby frequently inducing separation failure at the bead portion.

Experimental tests have demonstrated the result that if RW/SW is changed, the effective range of $B \cdot C/A^2$, which is determined by a combination of the total strain energy at the ply cord end shown in FIG. 3 and the heat generation temperature at the ply cord end shown in FIG. 4 and in which the separation failure of the bead portion is difficult to be induced, is inversely proportional to the value of RW/SW.

That is, the above mentioned test results have shown the fact that in the bead portion of the giant tire for off-road vehicles to be used under heavy load, the separation failure at the bead portion can remarkably be reduced, if $(B \cdot C/A^2) \times (RW/SW)$ lies within a range between 0.30 and 0.55, preferably in a range between 0.35 and 0.50.

Figure 5:
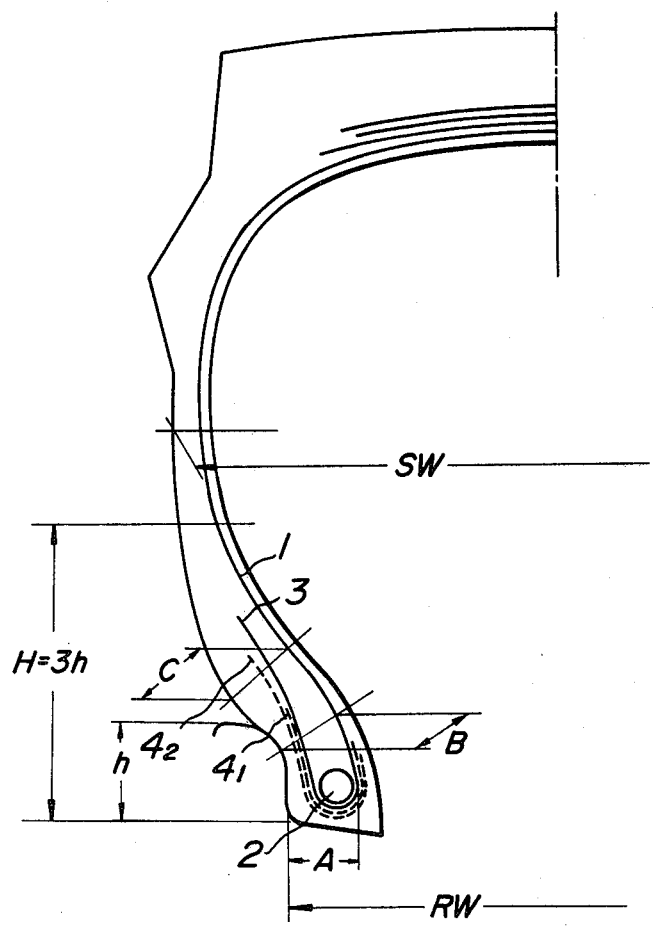
FIG. 5 is a cross-sectional view of left half of a comparative tire.

FIG. 5 shows a comparative tire in which $(B \cdot C/A^2) \times (RW/SW)$ is 0.74 and which has a chafer construction similar to those of the tires according to the invention shown in FIG. 1.

Figure 6:
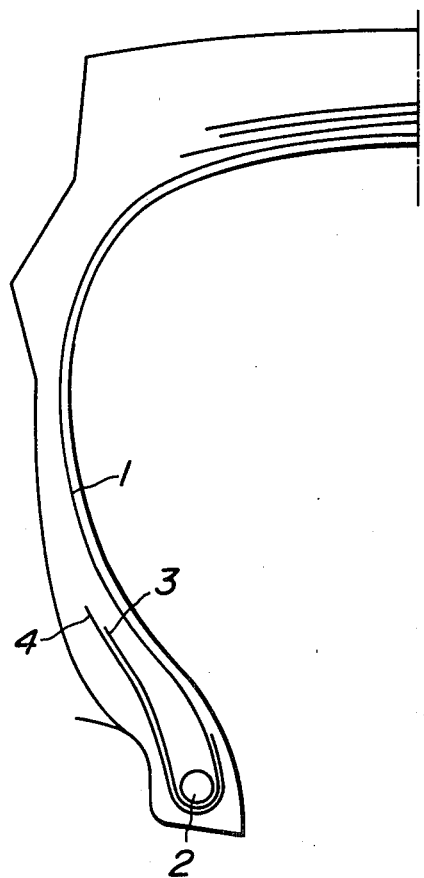
FIG. 6 is a similar view of another comparative tire showing a modified reinforcing layer, thereof.

FIG. 6 shows another comparative tire in which $(B \cdot C/A^2) \times (RW/SW)$ is also 0.74 and which has a chafer construction similar to those of the tire according to the invention shown in FIG. 2.

In the tire embodying the present invention shown in FIG. 1, the bead portion construction is reinforced by two chafers $4_1$, $4_2$ which extend from the positions lower than the upper end of the turn-up portion 3 of the carcass 1 and which are wound around the bead core 2 from the outside toward the inside thereof. The outer coating rubber of the bead portion has following dimensions. That is, the bead reference width A is 47.5 mm, the minimum rubber thickness B is 35.5 mm, and the maximum rubber thickness C is 44 mm. The tire maximum width SW is 585 mm, the width between the bead portion legs is 381 mm, RW/SW is 0.65, and $(B \cdot C/A^2) \times (RW/SW)$ is 0.45.

In the tire embodying the present invention shown in FIG. 2, the bead portion construction is reinforced by a wire cord chafer 4 which extends from the position higher than the upper end of the turn-up portion 3 of the carcass 1 and which is wound around the bead core 2 from the outside toward the inside thereof. The outer coating rubber of the bead portion has dimensions which are the same as those of the tire shown in FIG. 1. The tires according to the invention shown in FIGS. 1 and 2 have advantage that the separation failure at the bead portion can be eliminated.

Indoor drum tests effected on tires each having a tire size 21.00R35 have demonstrated the result shown in the following table.

TABLE

| Kind of Tire | Value of $\frac{B \cdot C}{A^2} \times \frac{RW}{SW}$ | Durability Index |
| --- | --- | --- |
| A | 0.25 | 110 |
| B | 0.48 | 130 |
| C | 0.62 | 100 |
| D | 0.85 | 90 |

In the above table, the durability index represents the index of the distance run by a tire whose bead portion becomes broken when the tire is subjected to the load which is gradually increased under a constant speed of the indoor drum testing machine.

As can be seen from the above table, the tire B has the thickness distribution of the outer rubber coating of the bead portion which is 0.48 which lies between a range defined by the present invention, that is, the range between 0.30 and 0.55. Any other comparative tires A, C and D whose thickness distribution in the outer coating rubber of the bead portion do not satisfy the condition defined by the present invention are inferior in durability index to that of the tire B according to the invention.

What is claimed is:

1. In a radial tire for heavy load vehicles comprising a carcass composed of wire cord plies having cords arranged substantially in a radial plane of the tire and wound around a bead core and a rubber stock disposed thereon from the inside to the outside thereof to form a turn-up portion, and a bead portion including at least one reinforcing layer arranged along the turn-up portion of the carcass and having cords crossed with the cords of said turn-up portion of the carcass, the reinforcing layer together with the turn-up portion of the carcass being sandwiched between and embedded in the rubber stock and an outer coating rubber, the improvement in which that end of the wire cords of the turn-up portion or reinforcing layer which is located below the maximum width position of the tire and disposed outside the bead core is arranged at a position which is higher than the height h of the rim flange of a bead portion mounting rim but lower than the height which is three times of the above height h, and the outer coating rubber of the bead portion has a thickness distribution with respect to a bead portion reference width A which is shorter than the height h of the rim flange and measured from the outer surface of the bead portion through the center of the bead core in parallel with the rotary axis of the tire to the carcass ply, the thickness distribution satisfying the following condition given by $$0.30 \leq (B \cdot C/A^2) \times (RW/SW) \leq 0.55$$

where
RW is a width between bead legs of the tire mounted on the rim,
SW is a maximum width between side portions of the tire mounted on the rim,
A is a bead portion reference width,
B is a minimum thickness of the rubber at the bead portion, and
C is a maximum thickness of the rubber at the bead portion.

2. A radial tire according to claim 1, wherein said reinforcing layer is composed of wire cords.

3. The radial tire according to claim 1, wherein said reinforcing layer is composed of organic textile cords or inorganic textile cords.

4. The radial tire according to claim 1, wherein said bead portion includes at least two reinforcing layers which are composed of a combination of the layer of wire cords and that of organic textile cords or inorganic textile cords.

5. The radial tire according to claim 1, wherein the thickness distribution of the outer coating rubber at the bead portion satisfies the following condition given by $$0.35 \leq (B \cdot C/A^2) \times (RW/SW) \leq 0.50.$$

* * * * *